US007395212B2

(12) United States Patent
Juneau et al.

(10) Patent No.: US 7,395,212 B2
(45) Date of Patent: Jul. 1, 2008

(54) ONLINE REACTIVATION OF AN ACCOUNT OR SERVICE

(75) Inventors: Brad Joseph Juneau, Leesburg, VA (US); Thomas Neal Donegan, Arlington, VA (US); Dmitri Vasilievich Kochetkov, Fairfax, VA (US); Allen Thomas Swann, Annandale, VA (US); Patricia Carter Tobin, Vienna, VA (US); David Crane Bishop, Ashburn, VA (US); Gregory John Weiss, Leesburg, VA (US)

(73) Assignee: AOL LLC, Dulles, VA (US)

( * ) Notice: Subject to any disclaimer, the term of this patent is extended or adjusted under 35 U.S.C. 154(b) by 1009 days.

(21) Appl. No.: 09/860,639

(22) Filed: May 21, 2001

(65) Prior Publication Data

US 2002/0019739 A1 Feb. 14, 2002

Related U.S. Application Data

(60) Provisional application No. 60/223,725, filed on Aug. 8, 2000.

(51) Int. Cl.
*G06Q 10/00* (2006.01)

(52) U.S. Cl. ................................ 705/1; 705/35; 705/38

(58) Field of Classification Search ..................... 705/1, 705/35, 38

See application file for complete search history.

(56) References Cited

U.S. PATENT DOCUMENTS

| | | | | |
|---|---|---|---|---|
| 5,611,052 | A * | 3/1997 | Dykstra et al. | 705/38 |
| 5,953,710 | A * | 9/1999 | Fleming | 705/38 |
| 6,105,007 | A * | 8/2000 | Norris | 705/38 |
| 6,658,393 | B1 * | 12/2003 | Basch et al. | 705/38 |
| 2002/0116228 | A1 * | 8/2002 | Bauer et al. | 705/4 |

OTHER PUBLICATIONS

Walter, James T. Truth in savings: 1994 developments and the new official staff commentary. (Consumer Financial Services Law), May 1995, Business Lawyer, 50, n3, 1049-1059.*

Optimism Prevails at Sears Payment Plant on Private Label Cards, Aug. 27, 1990, Card News, v5, n16, p. 1.*

Director, Office of Personnel Policy, Financial Administration Memorandum, May 1, 2000.*

* cited by examiner

*Primary Examiner*—John W. Hayes
*Assistant Examiner*—Shannon S Saliard
(74) *Attorney, Agent, or Firm*—Fish & Richardson P.C.

(57) ABSTRACT

Responding to an account reactivation request includes receiving an account reactivation request from a former subscriber having a deactivated account and automatically accessing stored account information related to the deactivated account based on the account reactivation request. The stored account information is compared with a reactivation standard to produce a comparison result. Based on the comparison result a response to the reactivation request is provided. The receiving, accessing, comparing, and responding may be performed by a computer without interaction between the former subscriber and a service representative.

76 Claims, 10 Drawing Sheets

615A 620A 605A 625A

| Account Information Data Field | Account Information | REACTIVATION STANDARD<br>Match Criteria | Match? |
|---|---|---|---|
| Account Status | deactivated | Any | Yes |
| Account Type | Platinum | Not Platinum | No |
| Payment Status | current | Any | Yes |
| 630A Payment Method | check 640A | credit, prepaid 635A | No 645A |
| Credit Status | AAA | Any | Yes |
| Account Activity Level | low 610A | Any | Yes |
| Account Profitability Metric | 2 | Any | Yes |
| Referrals Generated by Account | 0 | Any | Yes |

| Account Information Data Field | Account Information | REACTIVATION STANDARD<br>Match Criteria | Match? |
|---|---|---|---|
| Account Status | deactivated | Any | Yes |
| Account Type | Platinum | not Platinum | No |
| Payment Status | current | Any | Yes |
| 630A Payment Method | check 640A | check 610B | Yes 615B |
| Credit Status | AAA | Any | Yes |
| Account Activity Level | low | Any | Yes |
| Account Profitability Metric | 2 | Any | Yes |
| Referrals Generated by Account | 0 | Any | Yes |

FIG. 6B 605C 610C

| Account Information Data Field | Account Information | REACTIVATION STANDARDS<br>Match Criteria | Match? |
|---|---|---|---|
| Account Status | deactivated | Any | Yes |
| Account Type | Platinum | Platinum | Yes |
| Payment Status | current | Any | Yes |
| Payment Method | check | Any | Yes |
| Credit Status | AAA | Any | Yes |
| Account Activity Level | low | Any | Yes |
| Account Profitability Metric | 2 | Any | Yes |
| Referrals Generated by Account | 0 | Any | Yes |

| Account Information Data Field | Account Information | REACTIVATION STANDARDS<br>Match Criteria | Match? |
|---|---|---|---|
| Account Status | deactivated | deactivated | Yes |
| Account Type | Platinum | Gold to Platinum | Yes |
| Payment Status | current | current | Yes |
| Payment Method | check | credit | No |
| Credit Status | AAA | AAA to AAA+ | Yes |
| Account Activity Level | low | high | No |
| Account Profitability Metric | 2 | >3 | No |
| Referrals Generated by Account | 0 | Any | Yes |

| Account Information Data Field | Account Information | REACTIVATION STANDARDS Match Criteria | Match? |
|---|---|---|---|
| Account Status | deactivated | deactivated | Yes |
| Account Type | Platinum | Bronze or Greater | Yes |
| Payment Status | current | current | Yes |
| Payment Method | check | pre-Paid | No |
| Credit Status | AAA | AAA | Yes |
| Account Activity Level | low | medium or higher | No |
| Account Profitability Metric | 2 | <1 | No |
| Referrals Generated by Account | 0 | >3 | No |

705C

| Account Information Data Field | Account Information | REACTIVATION STANDARDS Match Criteria | Match? |
|---|---|---|---|
| Account Status | deactivated | deactivated | Yes |
| Account Type | Platinum | Tin to Gold | no |
| Payment Status | current | current | Yes |
| Payment Method | check | Any | Yes |
| Credit Status | AAA | AAA to AAAA | Yes |
| Account Activity Level | low | low to high | Yes |
| Account Profitability Metric | 2 | >1 | Yes |
| Referrals Generated by Account | 0 | Any | Yes |

| Account Information Data Field | Account Information | REACTIVATION STANDARDS Match Criteria | Match?: Match Value | Criteria Weight | Weighted Match Value |
|---|---|---|---|---|---|
| 984 Account Status | deactivated | active | No: -1 (930, 982) | 50 (986) | -50 (988) |
| 960 Account Type | Platinum (975) | Gold to Platinum (965) | Yes: 1 | 1 (970) | 1 (980) |
| Payment Status | current | current | Yes: 1 | 5 | 5 |
| 935 Payment Method | check (960) | credit (940) | No: -1 | 3 (945) | -3 (955) |
| Credit Status | AAA | AA to AAA+ | Yes: 1 | 1 | 1 |
| Account Activity Level | low 915 | high | No: -1 | 5 | -5 |
| Account Profitability Metric | 2 | >3 | No: -1 | 2 | -2 |
| Referrals Generated by Account | 0 | Any (930) | Yes: 1 | 0 | 0 |

FIG. 9

Eligibility Score: -53 905

1000

| REACTIVATION DETERMINATION LOOK-UP TABLE | |
|---|---|
| Reactivation Standards | Reactivation Determination |
| Reactivation standard_1 | Reactivation determination_1 |
| Reactivation standard_2 | Reactivation determination_2 |
| Reactivation standard_3 | Reactivation determination_3 |
| • • • | • • • |
| Reactivation standard_n-1 | Reactivation determination_n-1 |
| Reactivation standard_n | Reactivation determination_n |

ONLINE REACTIVATION OF AN ACCOUNT OR SERVICE

This application claims priority from U.S. Provisional Application No. 60/223,725, titled "(BOR) basic online reactivation" and filed Aug. 8, 2000, which is incorporated by reference in its entirety.

TECHNICAL FIELD

This invention relates to the reactivation of an account or service.

BACKGROUND

A recipient of an account activation request may determine that a deactivated account corresponding to the account activation request exists and that the account activation request may be satisfied by reactivating the deactivated account. For example, a previous subscriber to a service or product may contact the service or product provider when seeking to subscribe again to the service or product. When contacted, a representative of the service or product provider may collect caller identification information and information from the previous subscriber regarding the purpose of the contact. The representative may use the information provided by the previous subscriber to identify account information associated with the previous subscriber. Upon identification of the account information, the representative may respond appropriately to the reactivation request of the previous subscriber based upon the account information.

SUMMARY

In one general aspect, responding to an account reactivation request includes receiving an account reactivation request from a former subscriber having a deactivated account and automatically accessing stored account information related to the deactivated account based on the account reactivation request. The stored account information is compared with a reactivation standard to produce a comparison result. Based on the comparison result, a response to the reactivation request is provided. The receiving, accessing, comparing, and responding may be performed by a computer without interaction between the former subscriber and a service representative.

Implementations may include one or more of the following features. For example, the reactivation request may be received over the Internet or over the telephone. The reactivation request may include information associated with, for example, a birth date of a former subscriber, an account number of a deactivated account, an account type, an account deactivation date, or an account status. The reactivation request also may include, for example, information indicating a payment method, information indicating that the account has an outstanding balance due, information indicating that the account was cancelled by the former subscriber, or information indicating that the account was terminated by a provider of the account. Furthermore, the reactivation request may include demographic information related to the former subscriber or information about use of the account by the former subscriber.

Information included in the reactivation request may be used to access associated account information automatically from a relational database. When the associated account information is compared with the reactivation standard, an eligibility score may be generated as the comparison result. If the eligibility score satisfies a first predetermined threshold, the reactivation request may be accepted. Moreover, when the eligibility score satisfies a second predetermined threshold, the former subscriber may be offered an additional benefit, such as, for example, a service or account upgrade.

When the eligibility score does not satisfy the first predetermined threshold, then the reactivation request may be rejected. Alternatively, when the eligibility score does not satisfy the first predetermined threshold, the reactivation request may be accepted only when the former subscriber accepts an additional condition, such as, for example, a service or account downgrade, a payment method that differs from a payment method employed by the deactivated account, or a guarantee of payment.

These general and specific aspects may be implemented using a method, a system, or a computer program, or any combination of systems, methods, and computer programs.

Other features and advantages will be apparent from the description, the drawings, and the claims.

DESCRIPTION OF DRAWINGS

FIGS. 6A to 6C are tables illustrating an exemplary set of mutually exclusive reactivation standards and their relationship to the account information of FIG. 4.

FIGS. 7A to 7C are tables illustrating a sample of non-mutually exclusive reactivation standards and their relationship to the account information of FIG. 5.

FIG. 9 is a table illustrating a process for calculating an eligibility score that may be used in implementing the process of FIG. 8.

FIG. 10 is a table illustrating a look-up table used in implementing the system of FIG. 2.

Like reference symbols in the various drawings indicate like elements.

DETAILED DESCRIPTION

For illustrative purposes, FIGS. 1-10 describe a process for determining a response to a reactivation request, and a system for implementing the process. For clarity of exposition, the description of the process and the system implementing the process proceeds from an account of general elements and their high level relationship to a detailed account of illustrative roles, configurations, and components of the elements.

Figure 1:
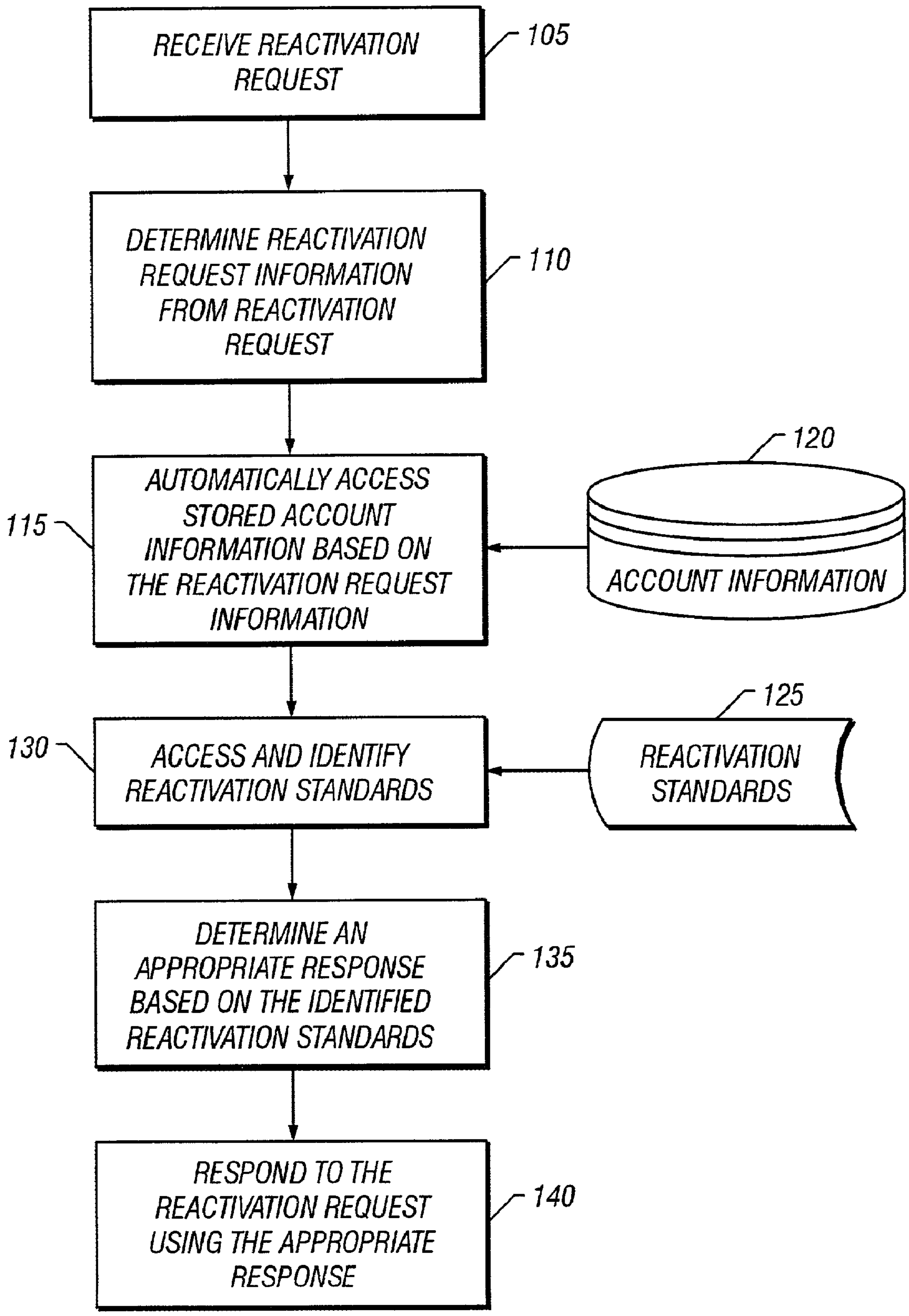
FIG. 1 is a schematic flow diagram illustrating a systematic process for processing a reactivation request.

Referring to FIG. 1, a reactivation request is received (step 105) and reactivation request information (subsequently described in detail with respect to FIG. 3) is determined from the reactivation request (step 110). The reactivation request information then is used to automatically access account information 120 (subsequently described in detail with respect to FIG. 5) that is associated with the reactivation request information (step 115). The account information 120 may include stored information that can be associated with the reactivation request information. The account information 120 also may include information held by third parties, such as, for example, a credit verification agency (not shown). Following access of the account information 120, reactivation standards 125 are accessed and the account information 120 is used to identify one or more of the reactivation standards 125 (described with respect to FIGS. 6A-9) (step 130). The identified reactivation standards are used to determine the appropriate response to the reactivation request (step 135) and the appropriate response is communicated to the prior subscriber (step 140).

Figure 2:
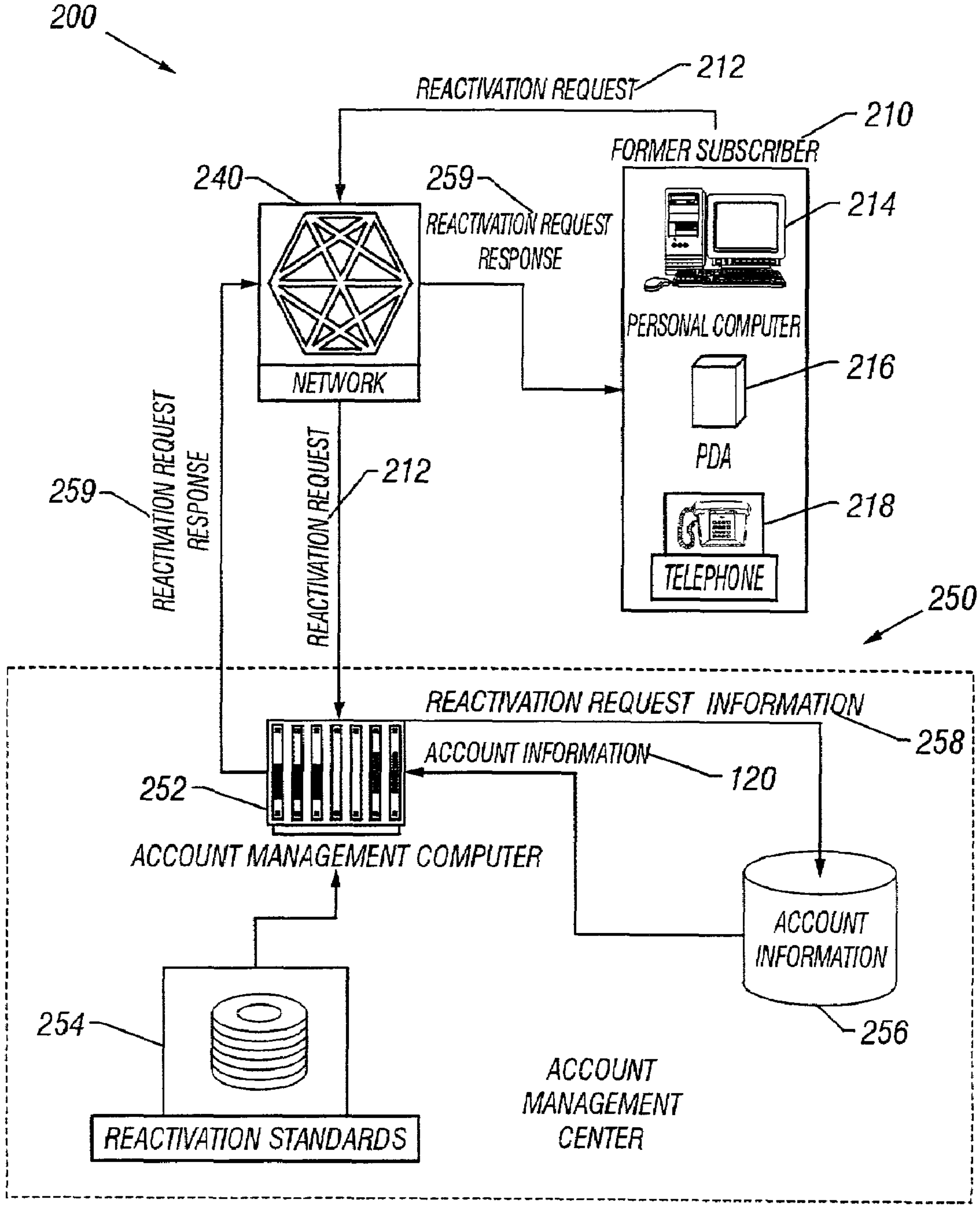
FIG. 2 is a schematic structure diagram of a system operating over an Internet Protocol network to implement the process of FIG. 1.

FIG. 2 shows, for example, a communication system 200 that may be used to implement the process of FIG. 1. The communication system 200 allows a former subscriber 210 to communicate a reactivation request 212 over a network 240 to a recipient (e.g., account management center 250). The reactivation request 212 may include, for example, an instant message, an electronic mail message, or a voice message (e.g., voice-over-IP (Internet Protocol)).

The former subscriber 210 typically communicates using one or more sending or controlling devices. For example, the former subscriber 210 may communicate using one or more sending devices (e.g., a personal computer 214, a PDA 216, or a telephone 218) generally capable of executing instructions under the command of one or more controlling devices (not shown) that may be internal or external to the sending devices. The sending devices may be connected to the controlling devices (not shown) by a wired or wireless data pathway (not shown) capable of delivering data.

A sending device used by the former subscriber 210 may typically include one or more hardware components and/or software components. The sending device may include, for example, one or more general-purpose or special purpose computers (e.g., personal computer 214, a workstation (not shown), or PDA 216) specifically programmed to perform certain tasks, such as, for example, communicating with each other and/or the network 240. The sending device also may include a wireless telephone 218, a pager (not shown), one or more local area networks (LANs) (not shown), one or more wide area networks (WANs) (not shown), one or more software components, a device, a component, some other physical or virtual equipment, and/or some combination of these devices that is capable of responding to and executing instructions.

The controlling device (not shown) used by the former subscriber 210 may include one or more hardware components and/or software components. An example of a controlling device is a software application loaded on the sending device for commanding and directing communications enabled by the sending device. Other examples include a program, a piece of code, an instruction, a device, a computer, a computer system, or a combination of these elements, for independently or collectively instructing the sending device to interact and operate as described herein. The controlling device may be embodied permanently or temporarily in any type of machine, component, physical or virtual equipment, storage medium, or propagated signal capable of providing instructions to the sending device.

The network 240 may include one or more other mechanisms for delivering data, such as, for example, the Internet, the World Wide Web, one or more LANs and/or one or more WANs, radio, cable, and/or satellite. The IP network 240 also may include analog or digital wired and wireless telephone networks, e.g., public switched telephone networks (PSTN), integrated services digital networks (ISDN), all types of digital subscriber lines (xDSL), advance mobile telephone service (AMPS), global system for mobile communications (GSM), code division multiple access (CDMA), and/or any other delivery mechanism for carrying voice or other data.

The communications system 200 generally includes an account management center 250 that may be arranged to operate as a component of or an affiliate to one or more other systems, such as, for example, one or more LANs (not shown) and/or one or more WANs (not shown). Typically, the account management center 250 will include one or more account management center devices, such as, for example, one or more account management computers 252. The account management computers 252 typically will include one or more hardware components and/or software components. An example of an account management computer 252 is a general-purpose computer (e.g., a personal computer, server, or workstation) capable of responding to and executing instructions in a defined manner. Other examples include a special-purpose computer, a device, a component, other physical or virtual equipment, or some combination of these devices that is capable of responding to and executing instructions. The response and execution of instructions by the account management computer 252 may be controlled by a software application loaded on the account management computer 252, or, for example, by a program, a piece of code, an instruction, a device, a computer, a computer system, or a combination thereof, for independently or collectively instructing the account management computer 252 to interact and operate as described herein.

The account management computer 252 typically will include a communication device (not shown) for sending and/or receiving data from the IP network 240. One example of the communications device is a modem. Other examples include a transceiver, a set-top box, a communications card, a satellite dish, an antenna, or another network adapter capable of communicating data with the IP network 240 through a wired or wireless pathway.

The account management computer 252 typically will be configured to communicate with internal and/or external storage for storing data and programs. The storage may include electrical, magnetic, and/or optical storage media. For example, the account management center 250 is shown to include a magnetic disk array 254 that is used to store the reactivation standards 125 accessed by the account management computer 252. The account management center 250 also may include a database 256, such as, for example, a relational database or an object oriented database, that is used by the account management computer 252 to store and to access the account information 120. The database 256 and the account information 120 that it contains may reside on any appropriate storage medium, such as, for example, a magnetic disk array.

The account management center 250 includes the account management computer 252, which is structured to receive the reactivation request 212 from the network 240 and to determine reactivation request information 258 from the received reactivation requests (e.g., step 110 of FIG. 1). The reactivation request information 258 may include, for example, identification information related to the former subscriber and/or billing information (see, e.g., FIG. 3). Using the reactivation request information 258, the account management computer 252 accesses stored account information 120 from, for example, relational database 256 (e.g., step 115 of FIG. 1).

The stored account information 120 includes, for example, account information related to a current or past account of the former subscriber 210.

The account management computer 252 uses the account information 120 and the reactivation standards 125 to determine an appropriate response 259 to the reactivation request 212 (the process of determining the appropriate response 259 is illustrated in more detail with reference to FIGS. 6A-9). The reactivation standards 125 may be stored, for example, on a disk drive 254, or in computer memory (not shown) to provide quick access. Upon determination of the appropriate response 259, the response 259 is communicated through the IP network 240 to the former subscriber 210.

Figure 3:
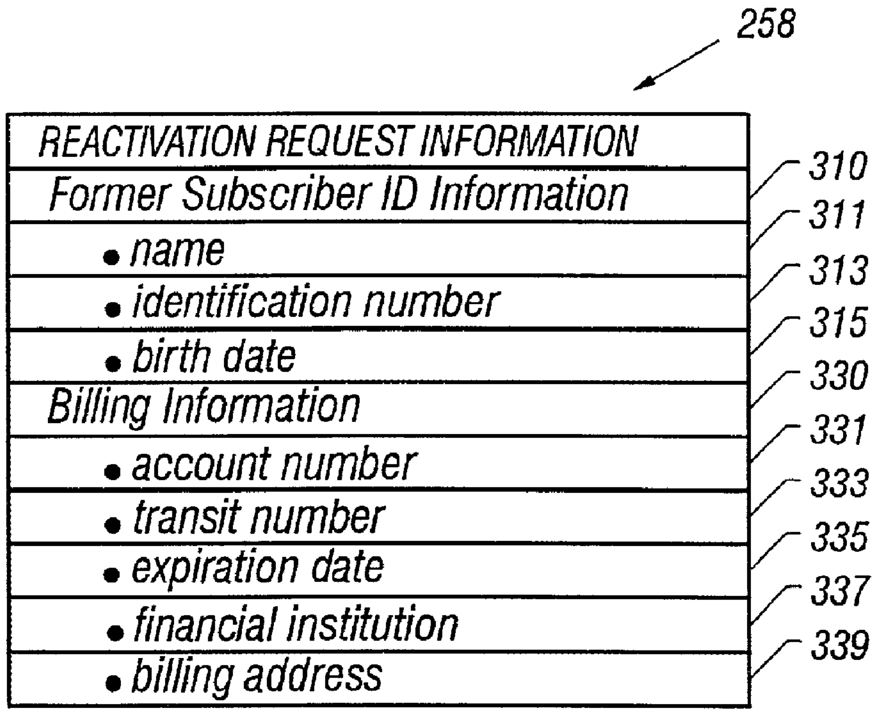
FIG. 3 is a table illustrating a composition of the reactivation request information of the process of FIG. 1.

Referring also to FIG. 3, the reactivation request information 258 may include former subscriber information 310, such as, for example, a name 311 associated with the former subscriber 210, an identification number (e.g., a social security number, a digital signature) 313 associated with the former subscriber 210, and/or a birth date 315 associated with the former subscriber 210. The reactivation request information 258 also may include billing information 330 associated with the former subscriber 210 or a financial institution that serves the former subscriber 210. The billing information 330 may include, for example, an account number (e.g., of a checking or credit account) 331, a bank transit number 333, an account expiration date 335, an official name of the financial institution 337, and/or a billing address (e.g., of the former subscriber or the financial institution) 339.

The reactivation request information 258 may be obtained, for example, from the former subscriber 210 through responses of the former subscriber 210 to an electronic questionnaire, whether flat or hierarchical, or by automatically parsing information from reactivation request content. In one implementation, the reactivation request information 258 includes information collected from the former subscriber 210 as responses by the former subscriber to Web pages included in a Web-hosted questionnaire.

Figure 4:
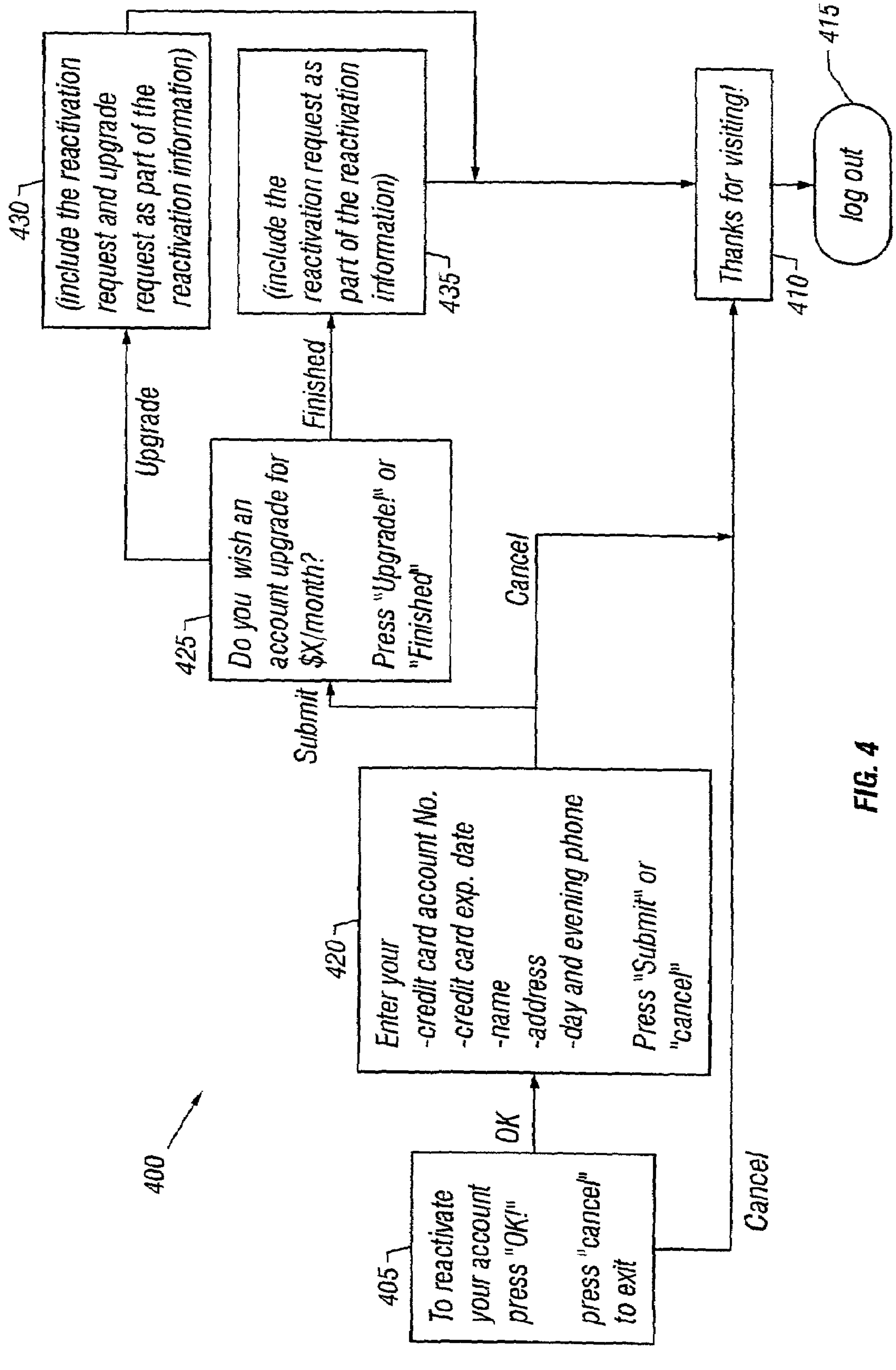
FIG. 4 is a schematic flow diagram illustrating a hierarchical Web-hosted questionnaire as provided in the system of FIG. 2.

For example, as shown in FIG. 4, a former subscriber 210 contacting a Web site of the account management center 250 may be presented with a hierarchical Web-hosted questionnaire 400. The former subscriber 210 is first prompted to indicate whether they wish to proceed with activation or reactivation of an account by selecting a button labeled "OK!" to reactivate an account of the former subscriber or by selecting a button labeled "cancel" to exit the questionnaire (step 405). When the former subscriber 210 exits the questionnaire, the former subscriber may be presented with a Web page that states, for example, "Thanks for visiting!" (step 410), after which the former subscriber is automatically logged out of the questionnaire (step 415). If the former subscriber 210 chooses to proceed with activation or reactivation by selecting "OK!" (step 405), then the former subscriber is presented with a Web form in which the former subscriber may enter information, such as, for example, a credit card account number, a credit card expiration date, a name of the former subscriber, an address associated with the former subscriber, and/or day and evening phone numbers associated with the former subscriber (step 420). Upon entry of the requested information the former subscriber may select "Submit" to submit the requested information, or "Cancel" to exit from the questionnaire. If the former subscriber chooses to cancel, the former subscriber is exited from the questionnaire (steps 410, 415).

Following submission of the requested information, the former subscriber may be presented with an additional Web page that asks the former subscriber "Do you wish an account upgrade for $X/month?" (step 425). If the upgrade is desired, the former subscriber may select "Upgrade!", in which case the reactivation request and the upgrade request are included as part of the reactivation information (step 430) and the former subscriber is exited from the questionnaire (steps 410, 415). Otherwise, if the former subscriber elects not to upgrade by selecting "Finished", the reactivation request is included as part of the reactivation information (step 435) and the former subscriber is exited from the questionnaire (steps 410, 415).

Figure 5:
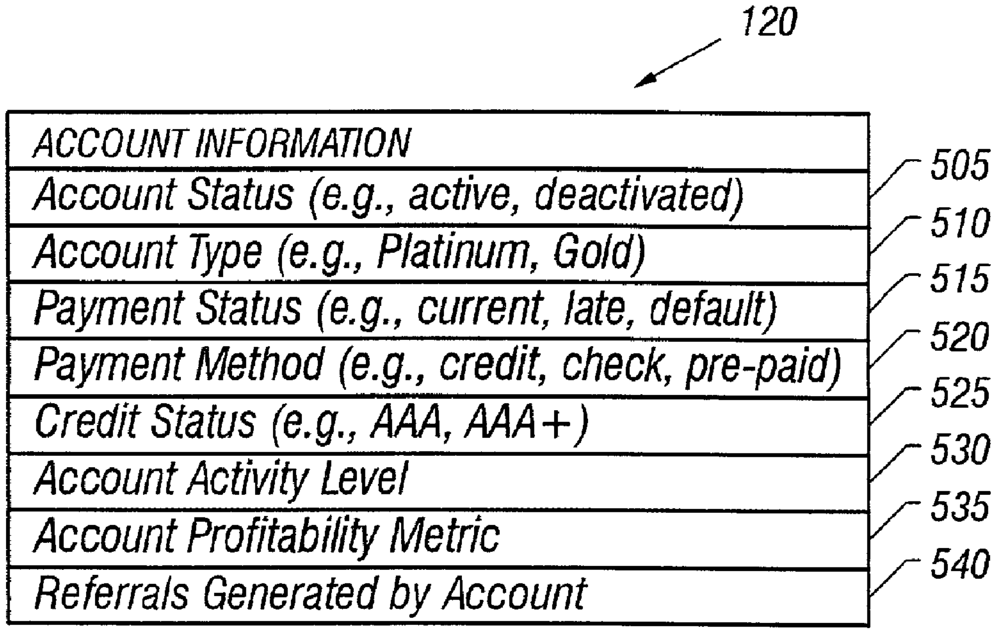
FIG. 5 is a table illustrating a composition of account information that may be used to implement the system of FIG. 2.

Referring also to FIG. 5, examples of the account information 120 described earlier with reference to FIGS. 1 and 2 may include information associated with the former subscriber, such as, for example, an account status (e.g., active, deactivated) 505, an account type (e.g., Platinum, Gold) 510, a payment status (e.g., current, late, default) 515, a payment method (e.g., credit, check, pre-paid) 520, or a credit status (e.g., AAA, AAA+) 525. Additionally, the account information may include information relating to an account activity level (e.g., high, moderate, low, unused) 530, an account profitability metric (e.g., +5 to −5) 535, or information relating to the account's referrals or new business generation 540.

The reactivation standards 125 that are stored in disk memory 254 and made accessible to the account management computer 252 may include information used to screen for exceptional reactivation requests that necessitate special and particular processing. Examples of exceptional reactivation requests include a reactivation request from a high volume customer that may require a higher level of service or a quicker response time than is normally provided. Alternatively, the reactivation request may be received from a former subscriber associated with an unprofitable account (e.g., due to excessive requests for customer support) and the reactivation request may be tagged for rejection.

FIGS. 6A to 6C illustrate three different reactivation standards 605A, 605B, and 605C that share a common form. The three figures are generally similar. For ease of description, the reactivation standard of FIG. 6A is discussed in detail and corresponding aspects of the reactivation standards of FIGS. 6B and 6C are not described.

Referring to FIG. 6A, reactivation standard 605A includes, by way of example, eight different match criteria 610A that correspond to data-fields 615A in the account information 620A. As part of the step of identifying a reactivation standard (step 135 of FIG. 1), the account information 620A that is accessed in the account information data-fields 615A is compared by the account management computer (e.g., account management computer 252) against the respective match criteria 610A of the reactivation standard 605A. An example of results 625A of the comparison is shown in the far right hand column of the table of FIG. 6A.

The account information data-field titled "payment method" 630A may have, for example, an associated match criterion 635A of credit or pre-paid. The account information 640A accessed in the payment method data-field 630A shows a payment method of check. Thus the match criterion 635A is not satisfied by the corresponding account information 640A, resulting in a failed match, as indicated at 645A. By contrast, referring to FIG. 6B, the match criterion 610B may indicate an acceptance of payment by check. When the account information 640A accessed in the payment method data field 630A shows a payment method of check, as shown by FIG. 6B, the match criterion 610B is satisfied and the satisfactory result is indicated at 615B.

Referring again to FIG. 6A, reactivation standard 605A may only partially match the account information 620A, as illustrated by the data-field-by-data-field results 625A. The same is true for FIG. 6B. However, with reference to FIG. 6C, a complete match may be achieved as shown in the data-field-by-data-field results 610C. Though not shown, there also may be a complete failure to match.

In one implementation, referring generally to FIGS. 2 and 6A-6C, the account information 120 may be used by the account management computer 252 to identify a completely matching reactivation standard, such as that illustrated by the reactivation standard 605C shown in FIG. 6C. In this implementation, the reactivation standards, for example, 605A, 605B, and 605C are configured such that one and only one reactivation standard will provide a complete match relative to the account information 120. In the simplified example provided, the possible world of former subscribers has been divided into those with an account type that is not Platinum and where the payment method is credit or prepaid, those with an account type that is not Platinum and where the payment method is check, and those with an account type that is Platinum. As configured, one, and only one, of the three reactivation standards 605A, 605B, and 605C will be satisfied, and any match will be an exclusive match. In the illustration, the former subscriber 210 is associated with a Platinum account and reactivation standard 605C is identified. The identified reactivation standard 605C then may be used by the account management computer 252 to identify an appropriate response 259 to the reactivation request 212 (illustrated later in greater detail).

In general, however, reactivation standards 125 may not be configured to ensure exclusive matches. For example, using the reactivation standards 705A, 705B, and 705C of FIGS. 7A to 7C, an implementation is described in which reactivation standards are matched as a matter of degree. In such an arrangement, a reactivation standard 125 may be selected through some mathematical comparison of, for example, account information 120 and comparison results. To enable such a mathematical comparison, a numerical value, also known as the eligibility score, may be produced from the match criteria, comparison results, or other criteria.

Figure 8:
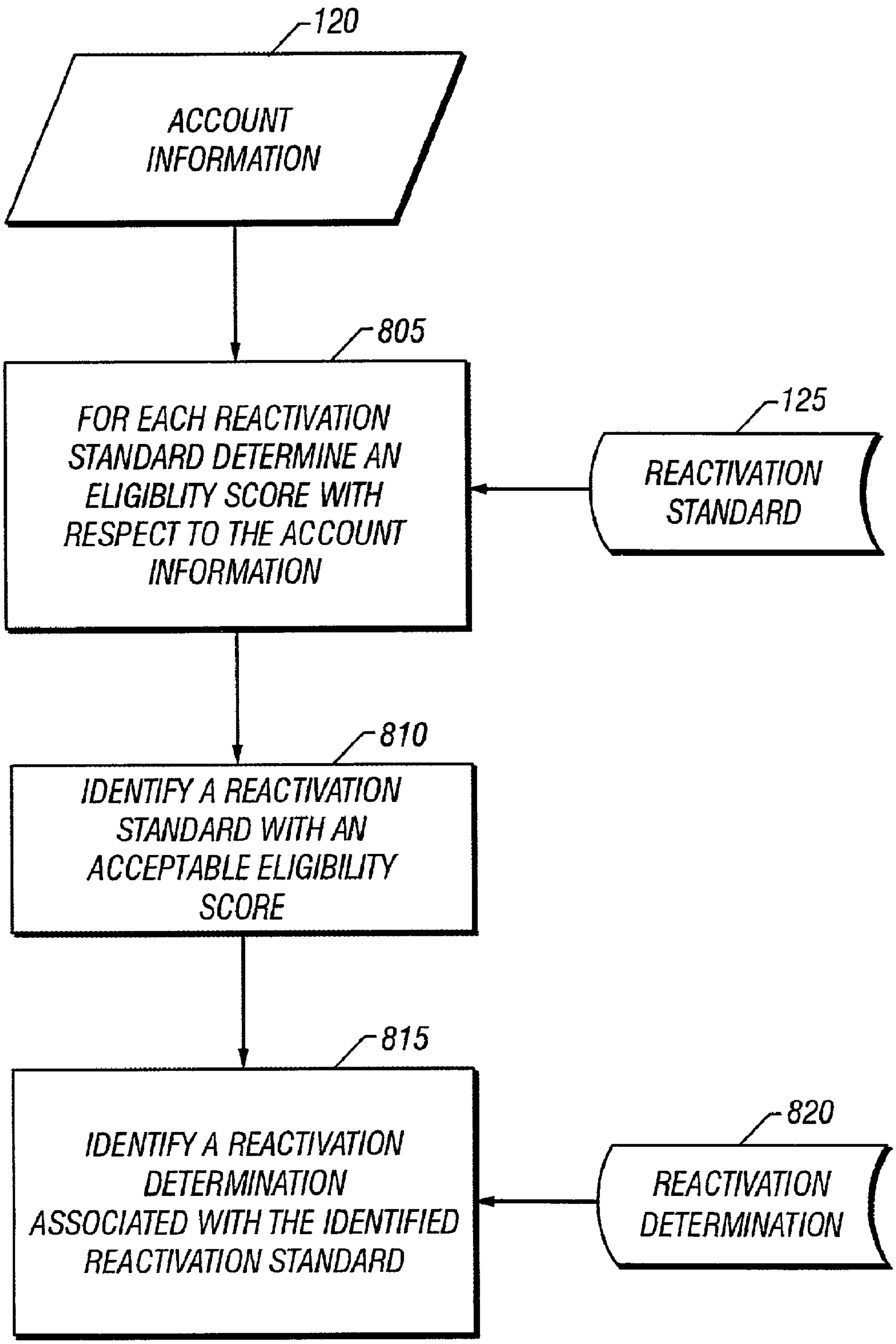
FIG. 8 is a schematic flow diagram illustrating a process for identifying one or more reactivation standards through use of eligibility scores that may be used in implementing the system of FIG. 2.

Referring to FIG. 8, an eligibility score is determined (step 805) with respect to the account information 120 for each reactivation standard 125. A reactivation standard with an acceptable, and perhaps best, eligibility score is identified (step 810) and used to identify (step 815) a reactivation determination 820 associated with the reactivation standard. An eligibility score provides an indirect metric of the appropriateness of a particular reactivation determination 820 for use in responding to a reactivation request 212.

Referring to FIG. 9, the eligibility score 905 may include a summation of weighted match values 910, where each match criterion 915 is used to produce an associated match value 920. The weighted match values 910, in turn, may include the result of the multiplication of a criterion weight 925 associated with a match criterion 915 by a match value 920 that may be, for example, "1" when the match criterion 915 is satisfied or "−1" when the match criterion 915 is not satisfied. Also, a zero may be used for a criterion weight 925 when a match criterion 915 will always be satisfied because it is configured to include all possible former subscribers, for example, the match criteria for referrals 930. To illustrate further, with respect to the payment method field 935, the match criterion 940 is assigned a criterion weight 945 of "3". However, the match criterion 940 is not satisfied by the account information 950 accessed in the payment method field 935. Therefore, the criterion weight 945 is multiplied by "−1" to produce a weighted match value 955 of "−3". By contrast, with respect to the account type field 960, the match criterion 965 is assigned a criterion weight 970 of "1" and the match criterion 965 is satisfied by the account information 975 accessed in the account type field 960. Therefore, the criterion weight 970 is multiplied by "1" to produce a weighted match value 980 of "1". A similar process is followed to arrive at a weighted match value 910 for each match criterion 915. All weighted match values 910 are then summed to arrive at an eligibility score 905 of "−53".

A weighting process, such as that described with respect to FIG. 9 or otherwise, may be used to emphasize one or more certain match criterion deemed important relative to one or more different match criterion. Moreover, it may be desirable that the magnitude of a weighted match value 910 differ depending upon whether a match was determined to exist. For example, it may be desirable that a weighted match value 910 dominate or dramatically impact a final eligibility score 905 when an account is indicated as being activated, such that reactivation is inappropriate. That same match value 910 may or may not be configured to dominate or dramatically impact the final eligibility score when the account is indicated as being deactivated. By way of illustration, the match value 982 corresponding to a failed match for the account status data-field 984 may be set at an appropriate scaling value, such as, for example, "−1", in combination with a high value, such as, for example, "50", for the corresponding criterion weight 986 to produce a weighted match value 988 of "−50" designed to have a dominating effect upon the final eligibility score 905. To avoid a similar dominating effect when the account is deactivated, the match value 996 may be assigned an appropriate scaling value such as, for example, zero or a very small positive non-zero value (not shown).

Once a reactivation standard 125 is identified, the reactivation standard 125 may be used to index a look-up table 1000, as shown in FIG. 10, that associates reactivation determinations 820 with the reactivation standards 125. The reactivation determinations 820 may include, for example, information indicating a determination to reactivate an account associated with the former subscriber and information defining the account and terms of the reactivation or a reward provided to the former subscriber for choosing to reactivate the account. The reactivation determination also may include information indicating a determination to reactivate the account only on terms changed from original terms associated with the deactivated account (e.g., account downgrade, altered payment conditions, trial period), or information indicating a determination to not reactivate the deactivated account.

Other implementations are within the scope of the following claims.

What is claimed is:

1. A method of responding to an account reactivation request, the method comprising:

receiving an account reactivation request from a former subscriber having a deactivated account;

automatically accessing stored account information related to the deactivated account of the former subscriber based on the account reactivation request;

comparing the stored account information with a reactivation standard, which includes at least one criterion that corresponds to at least one attribute of a deactivated account, to produce a comparison result; and responding to the account reactivation request based on the comparison result produced by comparing the stored account information with the reactivation standard, wherein the stored account information that is compared with the reactivation standard includes at least one of a payment method and an account type.

2. The method of claim 1 wherein receiving, accessing, comparing, and responding are performed by a computer without the former subscriber interacting with a service representative.

3. The method of claim 1 wherein receiving the account reactivation request comprises receiving an account activation request from the former subscriber and determining that the account activation request may be satisfied by reactivating the previously deactivated account.

4. The method of claim 1 wherein receiving the account reactivation request comprises receiving the account reactivation request over the Internet.

5. The method of claim 1 wherein receiving the account reactivation request comprises receiving the account reactivation request over the telephone.

6. The method of claim 1 wherein automatically accessing stored account information related to the deactivated account of the former subscriber includes using information contained in the account reactivation request to access associated account information stored in a relational database, and the information contained in the account reactivation request comprises an identifier associated with the former subscriber.

7. The method of claim 6 wherein the identifier comprises at least one of a name or an identification number associated with the former subscriber.

8. The method of claim 6 wherein the information contained in the account reactivation request further comprises a birth date of the former subscriber.

9. The method of claim 6 wherein the information contained in the account reactivation request further comprises an account number associated with the deactivated account.

10. The method of claim 1 wherein the stored account information that is compared with the reactivation standard includes an account deactivation date.

11. The method of claim 1 wherein the stored account information that is compared with the reactivation standard includes an account status.

12. The method of claim 11 wherein the account status includes information indicating that the account was cancelled by the former subscriber.

13. The method of claim 11 wherein the account status includes information indicating that the account was terminated by the account provider.

14. The method of claim 11 wherein the account status includes information indicating that the account has an outstanding balance due.

15. The method of claim 1 wherein the stored account information that is compared with the reactivation standard includes information indicating a payment method.

16. The method of claim 1 wherein the stored account information that is compared with the reactivation standard includes information indicating an account type.

17. The method of claim 1 wherein the stored information that is compared with the reactivation standard includes information about the demographics of the former subscriber.

18. The method of claim 1 wherein the stored account information that is compared with the reactivation standard includes information about the use of the account by the former subscriber.

19. The method of claim 1 wherein the comparison result comprises an eligibility score derived from comparing the stored account information with the activation standard.

20. The method of claim 19 wherein responding to the account reactivation request includes accepting the request to reactivate the deactivated account when the eligibility score satisfies a first predetermined threshold.

21. The method of claim 20 wherein responding to the account reactivation request further comprises offering the former subscriber an additional benefit when the eligibility score satisfies a second predetermined threshold.

22. The method of claim 21 wherein the additional benefit includes a service or account upgrade.

23. The method of claim 19 wherein responding to the account reactivation request includes rejecting the request to reactivate the deactivated account when the eligibility score does not satisfy a predetermined threshold.

24. The method of claim 19 wherein responding to the account reactivation request includes accepting the request to reactivate the deactivated account only when the former subscriber accepts an additional condition if the eligibility score does not satisfy a predetermined threshold.

25. The method of claim 24 wherein the additional condition includes a service or an account downgrade.

26. The method of claim 25 wherein the additional condition includes acceptance by the former subscriber of an agreement to provide a guarantee of payment, or of a payment method that differs from a payment method required by the deactivated account.

27. A system of responding to an account reactivation request, the system comprising:

receiving means for receiving an account reactivation request from a former subscriber having a deactivated account;

accessing means for automatically accessing stored account information related to the deactivated account of the former subscriber based on the account reactivation request;

comparing means for comparing the stored account information with a reactivation standard, which includes at least one criterion that corresponds to at least one attribute of a deactivated account, to produce a comparison result; and responding means for responding to the account reactivation request based on the comparison result produced by the comparing means, wherein the stored account information that is compared with the reactivation standard includes at least one of a payment method and an account type.

28. The system of claim 27 wherein the receiving means, accessing means, comparing means, and responding means do not cause the former subscriber to interact with a service representative.

29. The system of claim 27 wherein the accessing means includes database means for using information contained in the account reactivation request to access associated account information stored in a relational database, wherein the information contained in the account reactivation request comprises an identifier associated with the former subscriber.

30. The system of claim 27 wherein the stored account information that is compared with the reactivation standard includes an account deactivation date.

31. The system of claim 27 wherein the stored account information that is compared with the reactivation standard includes an account status.

32. The system of claim 27 wherein the stored account information that is compared with the reactivation standard includes information indicating a payment method.

33. The system of claim 27 wherein the stored account information that is compared with the reactivation standard includes information indicating an account type.

34. The system of claim 27 wherein the stored account information that is compared with the reactivation standard includes information about the demographics of the former subscriber.

35. The system of claim 27 wherein the stored account information that is compared with the reactivation standard includes information about the use of the account by the former subscriber.

36. The system of claim 27 wherein the comparison result comprises an eligibility score derived from comparing the stored account information with the activation standard.

37. The system of claim 36 wherein the responding means includes accepting means for accepting the request to reactivate the deactivated account when the eligibility score satisfies a first predetermine threshold.

38. The system of claim 37 wherein the responding means further comprises offering means for offering the former subscriber additional benefit when the eligibility score satisfies a second predetermined threshold.

39. The system of claim 36 wherein the responding means includes rejecting means for rejecting the request to reactivate the deactivated account when the eligibility score does not satisfy a predetermined threshold.

40. The system of claim 36 wherein the responding means includes conditional acceptance means for accepting the request to reactivate the deactivated account only when the former subscriber accepts an additional condition if the eligibility score does not satisfy a predetermined threshold.

41. A computer program stored on a computer readable medium for responding to an account reactivation request, the computer program comprising:

a receiving code segment that causes a computer to receive an account reactivation request from a former subscriber having a deactivated account;

an accessing code segment that causes the computer automatically to access stored account information related to the deactivated account of the former subscriber based on the account reactivation request;

a comparing code segment that causes the computer to compare the stored account information with a reactivation standard, which includes at least one criterion that corresponds to at least one attribute of a deactivated account, to produce a comparison result; and a responding code segment that causes the computer to respond to the account reactivation request based on the comparison result produced by the computer under the control of the comparing code segment, wherein the stored account information that is compared with the reactivation standard includes at least one of a payment method and an account type.

42. The computer program of claim 41 wherein the receiving, accessing, comparing, and responding code segments do not cause the computer to require that the former subscriber interact with a service representative.

43. The computer program of claim 41 wherein the accessing code segment includes a database code segment that causes the computer to use information contained in the account reactivation request to access associated account information stored in a relational database, wherein the information contained in the account reactivation request comprises a name and/or an identification number associated with the former subscriber.

44. The computer program of claim 41 wherein the stored account information that is compared with the reactivation standard includes an account deactivation date.

45. The computer program of claim 41 wherein the stored account information that is compared with the reactivation standard includes an account status.

46. The system of claim 41 wherein the stored account information that is compared with the reactivation standard includes information indicating a payment method.

47. The system of claim 41 wherein the stored account information that is compared with the reactivation standard includes information indicating an account type.

48. The system of claim 41 wherein the stored account information that is compared with the reactivation standard includes information about the demographics of the former subscriber.

49. The system of claim 41 wherein the stored account information that is compared with the reactivation standard includes information about the use of the account by the former subscriber.

50. The system of claim 41 wherein the comparison result comprises an eligibility score derived from comparing the stored account information with the activation standard.

51. The computer of claim 50 wherein the responding code segment includes an accepting code segment that causes the computer to accept the request to reactivate the deactivated account when the eligibility score satisfies a first predetermined threshold.

52. The computer program of claim 51 wherein the responding code segment further comprises an offering code segment that causes the computer to offer the former subscriber an additional benefit when the eligibility score satisfies a second predetermined threshold.

53. The computer program of claim 50 wherein the responding code segment includes a rejecting code segment that causes the computer to reject the request to reactive the deactivated account when the eligibility score does not satisfy a predetermined threshold.

54. The computer program of claim 50 wherein the responding code segment includes a conditional acceptance code segment that causes the computer to accept the request to reactive the deactivated account only when the former subscriber accepts an additional condition if the eligibility score does not satisfy a predetermined threshold.

55. A system of responding to an account reactivation request, the system comprising:

a first computer configured to receive an account reactivation request from a former subscriber having a deactivated account;

a second computer configured automatically to access stored account information related to the deactivated account of the former subscriber based on the account reactivation request and that compares the stored account information with reactivation standards, which include at least one criterion that corresponds to at least one attribute of a deactivated account, to produce a comparison result; and a third computer configured to respond to the account reactivation request based on the comparison result produced by the second computer, wherein the stored account information that is compared with the reactivation standard includes at least one of a payment method and an account type.

56. The system of claim 55 wherein the system does not cause the former subscriber to interact with a service representative when receiving the account reactivation request, when accessing the stored account information, and comparing the stored account information with the reactivation standards to produce a comparison result, or when responding to the account reactivation request.

57. The system of claim 55 wherein being configured automatically to access stored account information includes being configured to use information contained in the account reactivation request to access associated account information stored in a relational database, wherein the information contained in the account reactivation request comprises an identifier associated with the former subscriber.

58. The system of claim 55 wherein the stored account information that is compared with the reactivation standards includes an account deactivation date.

59. The system of claim 55 wherein the stored account information that is compared with the reactivation standards includes an account status.

60. The system of claim 55 wherein the stored account information that is compared with the reactivation standards includes information indicating a payment method.

61. The system of claim 55 wherein the stored account information that is compared with the reactivation standards includes information indicating an account type.

62. The system of claim 55 wherein the stored account information that is compared with the reactivation standards includes information about the demographics of the former subscriber.

63. The system of claim 55 wherein the stored account information that is compared with the reactivation standard includes information about the use of the account by the former subscriber.

64. The system of claim 55 wherein the comparison result comprises an eligibility score derived from comparing the stored account information with the activation standard.

65. The system of claim 64 wherein being configured to respond to the account reactivation request includes being configured to accept the request to reactivate the deactivated account when the eligibility score satisfies a first predetermined threshold.

66. The system of claim 65 wherein being configured to respond to the account reactivation request includes being configured to offer to the former subscriber an additional benefit when the eligibility score satisfies a second predetermined threshold.

67. The system of claim 64 wherein being configured to respond to the account reactivation request includes being configured to reject the request to reactivate the deactivated account when the eligibility score does not satisfy a predetermined threshold.

68. The system of claim 64 wherein being configured to respond to the account reactivation request includes being configured to accept the request to reactivate the deactivated account only when the former subscriber accepts an additional condition if the eligibility score does not satisfy a predetermined threshold.

69. The method of claim 1 wherein the method is performed by a computer.

70. The method of claim 1 wherein responding to the account reactivation request based on the comparison result includes one of indicating a determination to reactivate the account with the original terms, indicating a determination to reactivate the account with terms changed from the original terms of the deactivated account, and indicating a determination not to reactivate the account.

71. The method of claim 1 wherein a first response is used to respond to the account reactivation request when the comparison result indicates that the stored information matches all of the at least one criterion of the reactivation standard, and a second response is used to respond to the account reactivation request when the comparison result indicates that the stored information does not match all of the at least one criterion of the reactivation standard.

72. The method of claim 71 wherein the first response indicates a decision to reactivate the account and offer a reward for choosing to reactivate the account and the second response indicates a decision to reactivate the account.

73. The method of claim 71 wherein the first response indicates a decision to reactivate the account and the second response indicates a decision to reactivate the account if the former subscriber accepts terms changed from the original terms.

74. The method of claim 73 wherein the terms changed from the original terms include at least one of an account downgrade, an altered payment condition, and a trial period for reactivation.

75. The method of claim 1 wherein a first response is used to respond to the account reactivation request when the comparison result indicates that the stored information matches a first reactivation standard, and a second response is used to respond to the account reactivation request when the comparison result indicates that the stored information matches a second reactivation standard that differs from the first reactivation standard.

76. The method of claim 1 wherein the stored account information that is compared with the reactivation standard includes information related to the deactivated account of the former subscriber prior to deactivation.

* * * * *